US 6,668,130 B2

(12) United States Patent
Meyer

(10) Patent No.: US 6,668,130 B2
(45) Date of Patent: Dec. 23, 2003

(54) OPTICAL FIBER HARNESS

(75) Inventor: Daniel B. Meyer, Lake Oswego, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 10/272,669

(22) Filed: Oct. 16, 2002

(65) Prior Publication Data

US 2003/0103755 A1 Jun. 5, 2003

Related U.S. Application Data

(60) Provisional application No. 60/344,550, filed on Oct. 18, 2001.

(51) Int. Cl.[7] ............................................. G02B 6/00
(52) U.S. Cl. ........................................ 385/137; 439/464
(58) Field of Search ............................... 385/134, 135, 385/136, 137, 147; 439/464, 471

(56) References Cited

U.S. PATENT DOCUMENTS

| 3,720,906 A | * | 3/1973 | Punako et al. | 439/445 |
| 3,732,526 A | * | 5/1973 | Punako | 439/471 |
| 3,794,960 A | * | 2/1974 | Sugar | 439/459 |
| 4,488,769 A | * | 12/1984 | Feigl | 439/449 |
| 5,158,476 A | * | 10/1992 | Kirby | 439/471 |
| 5,700,156 A | * | 12/1997 | Bussard et al. | 439/471 |
| 6,045,394 A | * | 4/2000 | Matsuoka et al. | 439/464 |
| 6,134,370 A | * | 10/2000 | Childers et al. | 385/135 |
| 6,466,727 B1 | * | 10/2002 | Leeb | 385/137 |

* cited by examiner

Primary Examiner—T. C. Patel
(74) Attorney, Agent, or Firm—William K. Bucher

(57) ABSTRACT

An optical fiber harness has a unitary plastic body that is formed into a substantially circular member and a straight member. The straight member intersects the circular member forming a chord through the circular member. At least a first attachment member extends from the straight member for securing the optical fiber harness onto a circuit board. Tabs extend outward from the circular member for receiving an optical fiber.

6 Claims, 4 Drawing Sheets

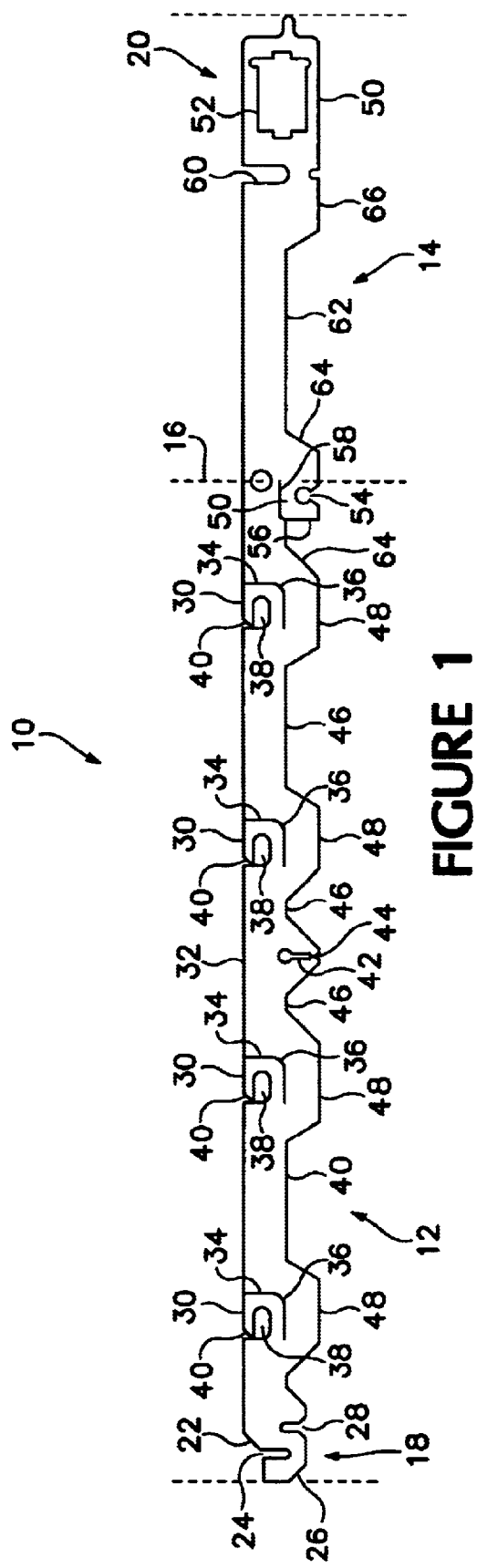

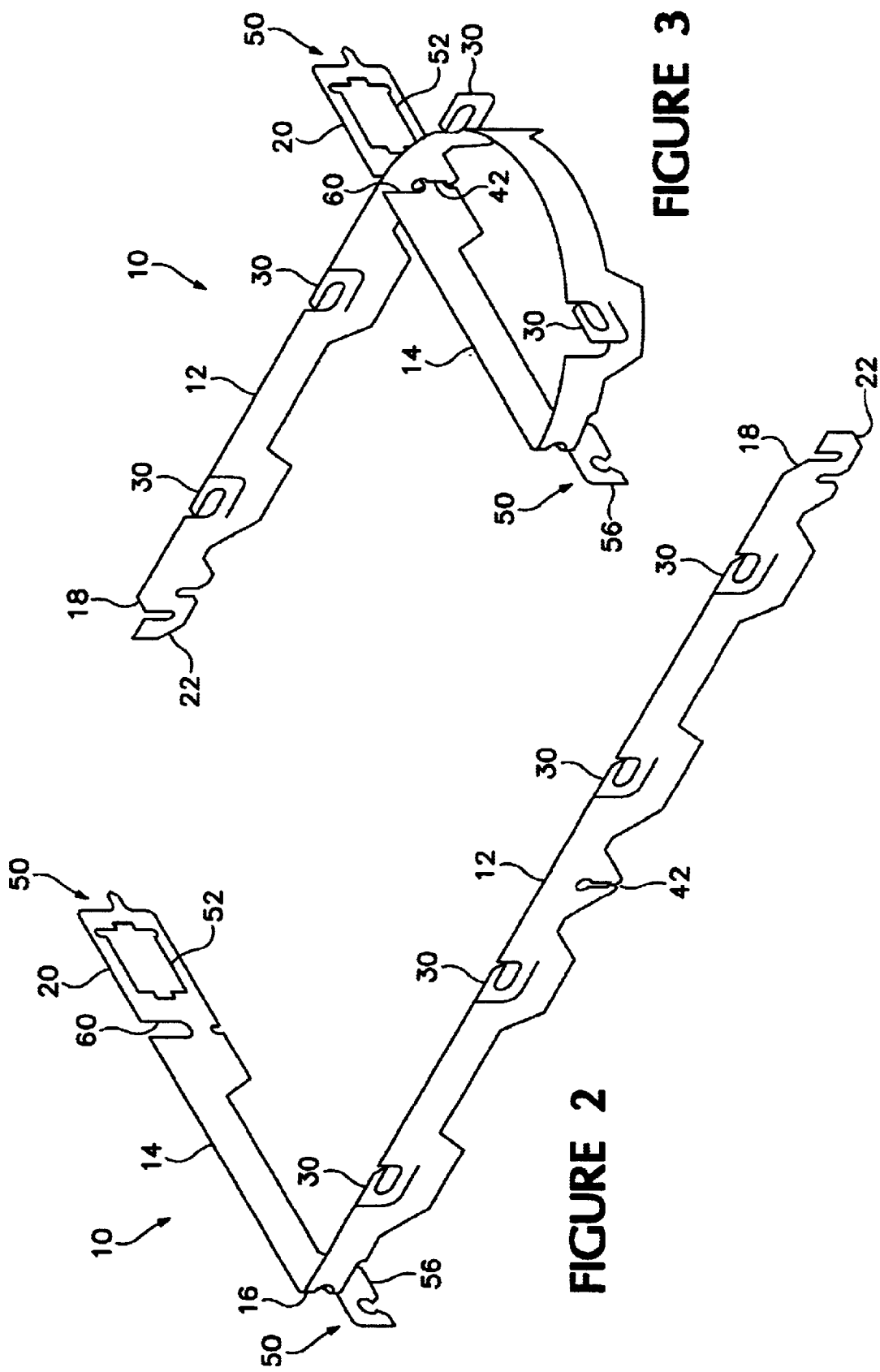

OPTICAL FIBER HARNESS

CROSS-REFERENCE TO RELATED APPLICATION

This application claims the benefit of the U.S. Provisional Application No. 60/344,550, filed Oct. 18, 2001.

BACKGROUND OF THE INVENTION

The present invention related generally to routing optical fiber in electronic equipment and more particularly to an optical fiber harness for measurement test equipment.

Optical components are used in measurement test equipment, such as optical time domain reflectometers (OTDR), optical spectrum analyzers, oscilloscopes and the like, for generating and receiving optical signals to and from a device under test. Generally, the optical components are manufactured with a length of optical fiber extending from the component that allow coupling to another component. The layout of optical and electrical components on a circuit board of the measurement instrument may result in an excess length of optical fiber between optical components. This requires the optical fiber to be affixed to the circuit board in a manner that does not produce tight bends or kinks in the fiber. A common solution is to place routing clips on the circuit board that accept the optical fiber. One type of routing clip is the Micro Wire Saddle, manufactured and sold by Richco, Inc., Chicago, Ill. under part number MWS-1-01. The micro wire saddle has a narrow rectangular base with sidewalls extending upward from the ends of the base. Extending inward from the top of the sidewalls are downward angled overlapping fingers having a small gap at the ends of the fingers. Extending downward from the bottom of the base is a snap-lock retention member that engage holes formed in the circuit board. Another type of routing clip manufactured by the same company is the Micro Wire Saddle on Base, sold under part numbers MWSB-1-01A-RT and MWSEB. Each micro saddle on base are of similar construction with a square base and opposing narrow sidewalls extending upward from two sides of the base. Extending inward from the top of the sidewalls are downward angled overlapping fingers having a small gap at the ends of the fingers. The underside of the base has double sided adhesive tape. The adhesive side micro wire saddle on base is secured to open spaced laid out on the circuit board. Excess optical fiber is routed through the routing clips.

A drawback to using these types of routing clips is that they take-up valuable real estate on the circuit board that could be used for instrument components. Additionally, board layout complicated in the fact that routing clip locations have to be provided on the board that correspond to the excess amount of fiber on the optical component. Further, care must be used in routing the fiber through the routing clips to make sure that no kinks or type bends are formed in the optical fiber.

What is needed is a an optical fiber harness that does not take-up real estate on the circuit board. The optical fiber harness should be easily placable on the circuit board and easily receive an optical fiber. The optical fiber harness should also provide a constant bend radius for the optical fiber.

SUMMARY OF THE INVENTION

Accordingly, the present invention is an optical fiber harness having a flat, flexible unitary plastic body folded to form first and second segments. Each segment has a free end and a common fold junction. The first segment is formed into a substantially circular member having outwardly extending tabs. Each tab has an aperture formed therein for receiving an optical fiber. Each tab may be formed with a notch that intersects the apertures for placement of an optical fiber in the notch. A locking member is formed at the free end of the first segment for securing the free end of the circular member to the other end of the circular member at the common fold junction. The second segment is formed into a straight member extending from the common fold junction and intersecting the circular member forming a chord through the circular member. The straight portion has at least a first attachment member extending past the circular member for securing the optical fiber harness onto a circuit board and a locking member for securing the free end of the straight member to the circular member.

In one embodiment, the free end of the second segment extends past the circular member and the attachment member comprises an aperture formed in the straight member at the free end of the second segment. In a further embodiment, the attachment member extends past the circular member at the common folded junction and comprise a notch formed in the attachment member adapted for receiving a coaxial cable. Both attachment member embodiments may be incorporated into the optical fiber harness. The first segment locking member has a hook-like projection formed in the free end of the first segment that engages a notched portion of the first segment adjacent to the common fold junction. The second segment locking member has a first notch formed in the straight member for receiving the intersecting portion of the circular member and a second notch formed in the intersecting circular member for receiving the straight member.

The objects, advantages and novel features of the present invention are apparent from the following detailed description when read in conjunction with the appended claims and attached drawings.

BRIEF DESCRIPTION OF THE DRAWING FIGURES

FIG. 1 is a plan view of the flat, flexible unitary plastic body of the optical fiber harness according to the present invention.

FIG. 2 is a perspective view of common folded junction defining first and second segments in the unitary plastic body of the optical fiber harness according to the present invention.

FIG. 3 is a perspective view of the intersection of the first and second segments of the unitary plastic body of the optical fiber harness according to the present invention.

DETAILED DESCRIPTION OF THE PREFERRED EMBODIMENT

Figure 4:
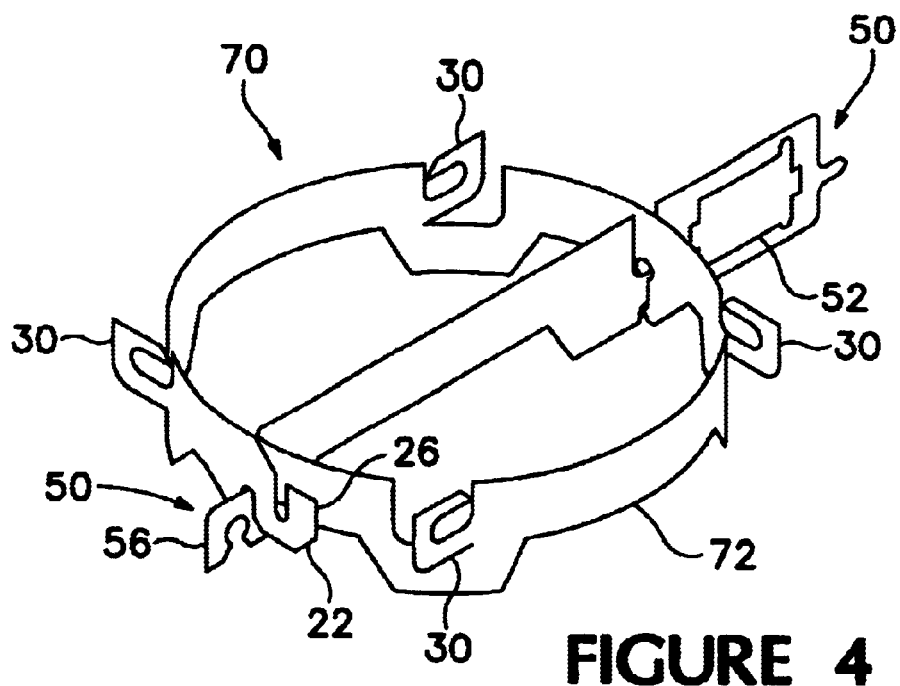
FIG. 4 is a perspective view of the first segment formed into a circular member and the second segment formed into a straight member in the optical fiber harness according to the present invention.

The optical fiber harness of the present invention is formed of a flat, flexible unitary plastic body 10 as shown in FIG. 1. The unitary plastic body 10 is preferably made of a polypropylene film having a thickness of approximately 0.031 inches that allows the unitary plastic body to be folded and formed into the optical fiber harness. The overall length of the plastic body is approximately 12 inches and the height is approximately 0.626 inches The unitary plastic body 10 is divided into first and second segments 12 and 14 that are defined by a common fold junction 16 as shown in FIG. 2. The first segment 12 has a length of approximately 8.3 inches and the second segment having a length of 3.7 inches. Each segment has a free end 18 and 20. The free end 18 of the first segments 12 is tapered to form a hook-shaped locking member 22. The hook-shaped locking member 22 has an upward opening slot 24 defining the hook portion 26 and a downward opening slot 28 that engages the second segment 14. The first segments 12 has approximately equally spaced tabs 30 formed adjacent to the top edge 32 of the unitary plastic body 10. Each tab 30 is preferably formed by making a vertical cut 34 in the unitary plastic body from the top edge 32 and a horizontal cut 36 extending from the vertical cut 34 with the intersection of the two cuts having a radius cut. Each tab 30 has an aperture 38 formed therein for receiving an optic fiber. In the preferred embodiment, a notch 40 is formed in each of the tabs 30 that intersects the aperture 30. A downward opening slot 42 is formed adjacent to the bottom edge 44 of the unitary plastic body 10 approximately at the middle of the first segment for engaging the second segment 12. A series of notches 46 are formed at the bottom edge 44 in the unitary plastic body 10 to produce trapezoidal shaped feet 48 under the tabs.

The second segment 14 is preferably formed with at least a first attachment member 50 for securing the optical fiber harness onto a circuit board. One configuration of the attachment member 50 is an aperture 52 formed in the free end 20 of the second segment 14. Another configuration of the attachment member 50 is a slot 54 formed in an extension member 56 of the second segment 14 at the common fold junction 16. The extension member 56 is formed adjacent to the notch 46 at the common fold junction 16 and extends past the common fold junction 16. A horizontal cut 58 is made in the unitary plastic body 10 from the notch 46 to the common fold junction 16. In the preferred embodiment of the invention both attachment member configurations are provided as part of the optical fiber harness. Alternately, a single attachment member 50 may be used. Further, multiple attachment members 50 of a single configuration may be formed on the unitary plastic body 10 of the optical fiber harness. An upward opening slot 60 is formed from the top edge 32 of the unitary plastic body 10 in the second segment 14 for receiving the downward opening slot 42 of the first segment 12. A notch 62 is formed in the bottom edge 44 in the unitary plastic body 10 to produce a foot 64 adjacent to the common fold junction 16 and a foot 66 adjacent to the free end 20 of the second segment 14.

Figure 5:
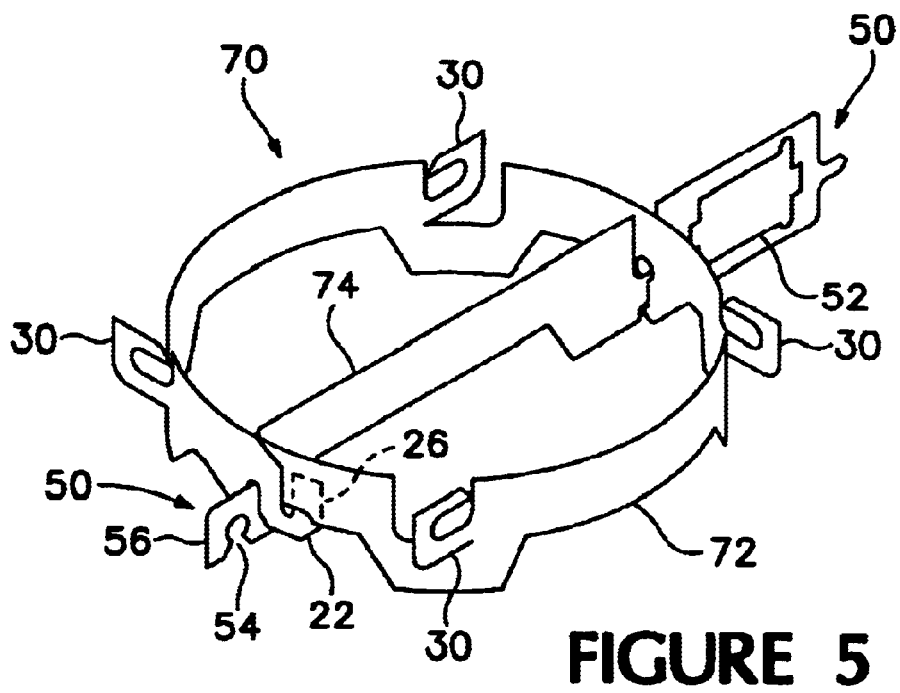
FIG. 5 is a perspective view of the first segment hooked locking member in the optical fiber harness according to the present invention.

FIGS. 2 through 5 illustrate the construction of the optical fiber harness 70 from the unitary plastic body 10. FIG. 2 shows the first and second segments 12 and 14 folded at a right angle to each other at the common fold junction 16. The extension member 56 extends past the common fold junction 16. FIG. 3 shows the first segment 12 being bent in a semicircle so that the first segment 12 intersects the second segment 14. The first and second segments 12 and 14 are interlocked by the engagement of the slot 42 with the second segment 14 at the slot 60 in the second segment 14. The free end 20 of the second segment 14 containing the aperture 52 extends past the intersection of the first and second segments 14. FIG. 4 shows the first segment 12 formed into a substantially circular member 72 with the free end 18 of the first segment 12 overlapping the other end of the first segment 12 at the common fold junction 16. The downward opening slot 28 of the first segment 12 engages the extension member 56 of the second segment 14. The tabs 30 of the circular formed first segment 12 extend outward from the unitary plastic body 10. FIG. 5 shows the hook portion 26 of the hook-shaped locking member 22 engaging the interior surface of the circular formed first segment 12 adjacent to the common fold junction 16. The resulting optical fiber harness 70 has the second segment 14 formed into a straight member 74 extending from the common fold junction 16 and intersecting the circular formed first member 12 forming a chord through the circular member 72. The free end 20 of the second segment 14 has one configuration of the attachment member 50 extending past the circular member 72 in the form of the aperture 52 and the other end of the second segment 14 has the extension member 56 with the other described attachment member 50 in the form of the slot 54.

Figure 6:
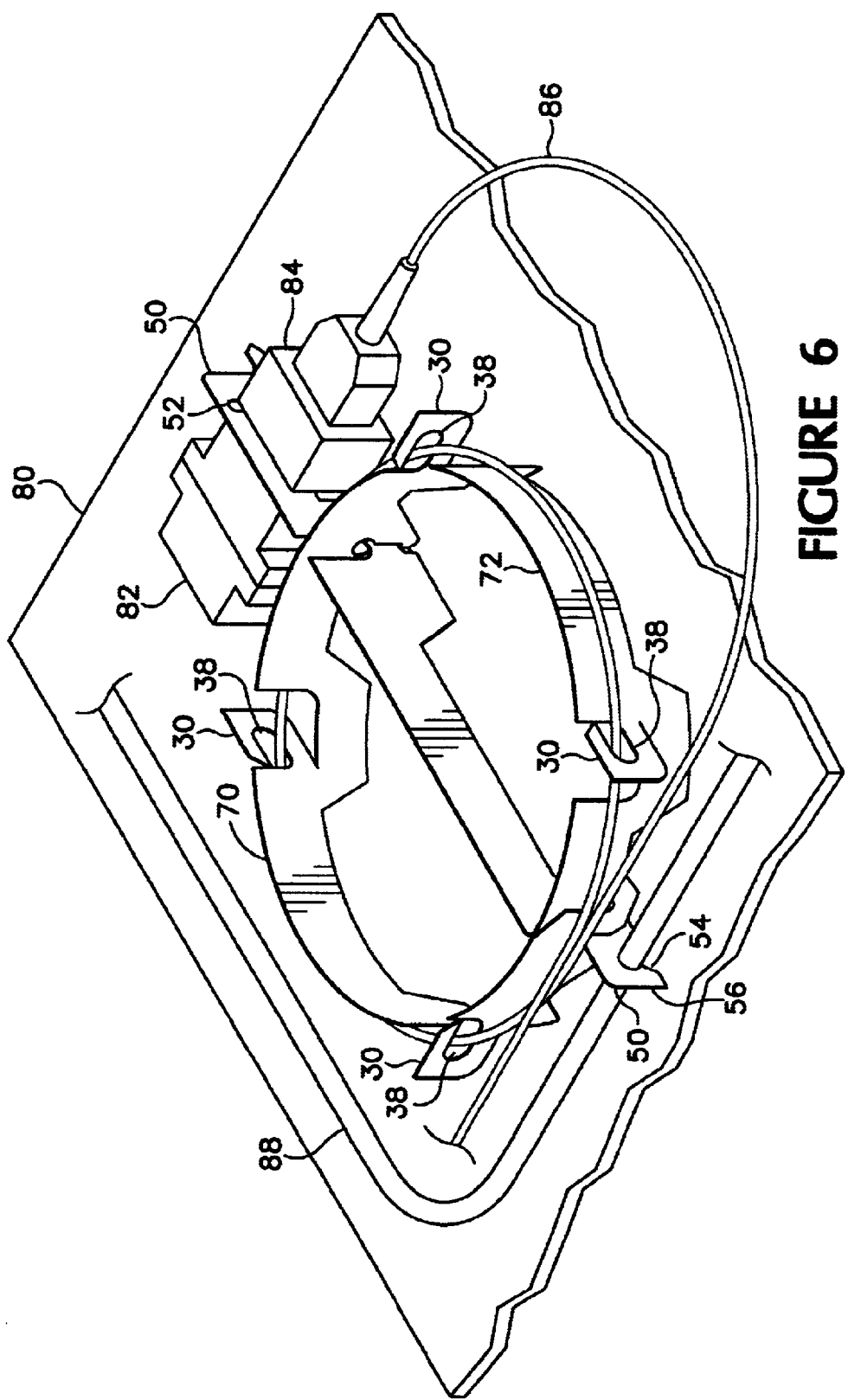
FIG. 6 is a perspective view of the optical fiber harness positioned on a circuit board.

Referring to FIG. 6, there is shown a simplified illustration of a circuit board 80 usable with the optical fiber harness 70. An optical connector receptacle 82 is fixedly mounted to the circuit board 80 by a bracket (not shown) hidden by the attachment member 50. A mating optical connector plug 84 mating connects to the receptacle 82. A length optical fiber 86 extends from the connector plug 84. The optical fiber harness 70 is secured to the circuit board 80 using the attachment members 50 extending from the first segment circular member 72. The optical connector receptacle 82 and plug 84 capture the attachment member 50 at the free end 20 of the second segment 14 by the optical connector plug 84 passing through the aperture 52 of the attachment member 50 and plugging into the optical connector receptacle 82. The slot 54 formed in the extension member 56 of the extension member 50 is positioned on a semi-rigid coaxial cable 88 running over the circuit board 80. The excess length of the optical fiber 86 is wound around the circular member 72 of the optical fiber harness and inserted into the apertures 38 of the tabs 30. The optical fiber 86 may be wound around and secured in the optical fiber harness 70 multiple times depending on the excess length of the optical fiber 86.

An optical fiber harness has been described having a flat, flexible, unitary plastic body that is formed into a circular member and a straight member. The circular member is a first segment of the unitary plastic body and the straight member is a second segment of the unitary plastic body. The unitary plastic body is folded to form a right angle common fold junction between the first and second segments. The first segment is approximately equally spaces tabs that extend outward when the first segment is formed into the circular member. The first segment has a hook-like projection extending from the free end of the first segment that locks into the other end of the first segment at the common fold junction. The straight member of the second segment intersects the circular member forming a chord through the circular member. The second segment has at least a first attachment member for securing the optical fiber harness onto a circuit board or the like. The second segment has an upward opening slot that engages a downward opening slot on the first segment to lock the second segment to the first segment.

It will be obvious to those having skill in the art that many changes may be made to the details of the above-described embodiments of this invention without departing from the underlying principles thereof. The scope of the present invention should, therefore, be determined only by the following claims.

What is claimed is:

1. An optical fiber harness comprising:

a flat, flexible unitary plastic body folded to form first and second segments with each segment having a free end and a common fold junction;

the first segment formed into a substantially circular member having outwardly extending tabs with apertures formed in the tabs for receiving an optical fiber and a locking member formed at the free end of the first segment for securing the free end of the circular member to the other end of the circular member at the common fold junction; and the second segment formed into a straight member extending from the common fold junction and intersecting the circular member forming a chord through the circular member with the straight portion having at least a first attachment member extending past the circular member for securing the optical fiber harness onto a circuit board and a locking member for securing the free end of the straight member to the circular member.

2. The optical fiber harness as recited in claim 1 wherein the attachment member extends past the circular member at the common fold junction and comprises a notch formed in the attachment member adapted for receiving circuit board component.

3. The optical fiber harness as recited in claim 1 wherein the free end of the second segment extends past the circular member and the attachment member comprises an aperture formed in the straight member at the free end of the second segment adapted for receiving a circuit board component.

4. The optical fiber harness as recited in claim 1 wherein the first segment locking member comprises a hook-shaped projection formed in the free end of the first segment engaging a notched portion of the first segment adjacent to the common fold junction.

5. The optical fiber harness as recited in claim 1 wherein the second segment locking member comprises first and second notches with one notch formed in the straight member for receiving the intersecting portion of the circular member and the second notch formed in the intersecting circular member for receiving the straight member.

6. The optical fiber harness as recited in claim 1 wherein the outwardly extending tabs further comprise a notch formed in each of the tabs that intersects the apertures.

* * * * *